Aug. 13, 1957  A. J. ORSINO  2,802,332
HIGH ENERGY GAS PRODUCER
Filed Dec. 28, 1955
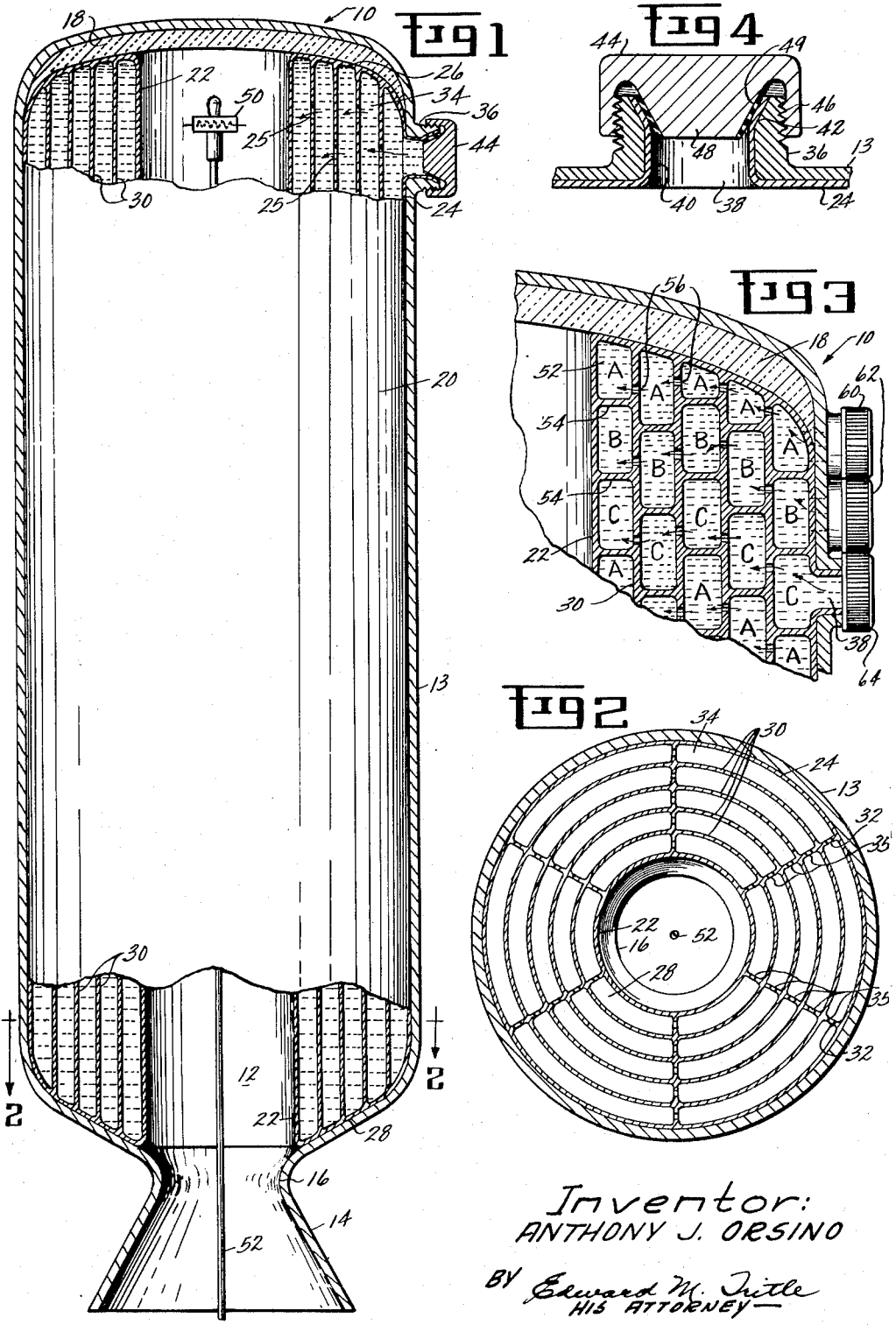
Inventor:
ANTHONY J. ORSINO
BY Edward M. Tittle
HIS ATTORNEY

2,802,332

HIGH ENERGY GAS PRODUCER

Anthony Joseph Orsino, Schenectady, N. Y., assignor to General Electric Company, a corporation of New York Application December 28, 1955, Serial No. 555,920

3 Claims. (Cl. 60—35.6)

This invention relates to liquid propellant rockets and in particular to a liquid propellant rocket of the type provided with its own self supplying fuel medium within the rocket chamber itself.

In the previously used methods of supplying liquid propellants in rockets, a turbopump or the like is necessary to provide the pressure for forcing the liquid through an injector into the combustion chamber of the rocket motor. The use of a turbopump system requires in addition, apparatus for driving the turbopump. This is very disadvantageous since it adds considerable weight in addition to that of the rocket.

Another method used for supplying liquid propellant to the combustion chamber of the rocket has been by providing a gas pressurizing system. Here again these gases must be stored in high pressure tanks which require thick walls to retain such pressures thereby increasing the weight of the rocket. The increase in weight is very detrimental since it cuts down the amount of fuel the rocket can carry. Therefore, it is an object of this invention to decrease the weight of the rocket and keep it down to a minimum so that additional fuel may be carried on board the rocket.

Another system for supplying a propellant to a combustion chamber without using turbopumps or gas tanks under high pressure is by using solid propellants within the combustion chamber of the rocket motor. However, the use of solid propellants has certain disadvantages mostly from a logistics standpoint. The solid propellant must be cast within the rocket chamber at the time it is being constructed at the chemical plant. Therefore, considerable care must be used in transporting the rocket containing the solid propellant. Solid propellants are dangerous during handling and the transporting of the rocket in that the constituents of the solid propellant must be initially mixed so as to be in contact with each other to begin with and are easily combustible due to friction and impact during handling. This danger is something that cannot be avoided when using solid propellants as the reactants. It is therefore, a general object of this invention to provide a liquid propellant rocket capable of obviating the above difficulties.

It is a further object of this invention to provide a liquid propellant rocket having the features of a solid propellant without the detriments accompanying the solid propellants.

Another further object of this invention is to provide a liquid propellant rocket without the necessity of providing a pressurization and fuel system for supplying liquid propellants to the combustion chamber of the rocket.

It is a still further object of this invention to provide a liquid system for a rocket motor without moving parts.

These and other objects will become more apparent when read in the light of the accompanying specification and drawing wherein similar parts are referred to by the same numbers and wherein the parts are designated specifically but are intended to be applied as generically as the prior art will permit, and wherein;

Figure 1 is a cross-sectional view of the rocket showing the cellular type construction partly in broken section, Figure 2 is a cross-sectional view of the rocket chamber and the cellular construction taken on lines 2—2 of Figure 1, Figure 3 is a modified form of the invention showing a cellular construction for retaining several propellants, Figure 4 is a cross-sectional view of the filler.

Briefly stated and according to one aspect of this invention, a high energy gas producer is provided in which fluid propellants are used without the necessity of including additional pressurizing devices. The device is capable of providing a self pressurizing system of reactants in the combustion chamber of a rocket in which the reaction or combustion takes place.

Referring to Figures 1 and 2 the numeral 10 generally designates a rocket motor or high energy gas producer. The rocket motor consists of a combustion chamber 12 having an outside metal container 13. The rocket motor also is provided with a nozzle 14 having a throat 16. The top of the rocket motor contains a ceramic shield 18 in order to protect and insulate the top of the rocket motor from the high temperatures. The rocket motor is lined with a cellular like structure 20. The expendible cellular-like structure comprises an inner cylinder wall 22 radially spaced from an outer cylindrical wall 24. The inner and outer walls are integrally connected by a top portion 26 and lower portion 28 curved to fit the contour of the rocket motor. Additional cylindrical walls 30 are spaced intermediate the inner and outer cylindrical walls 22 and 24 and formed integral with the top and lower portions 26 and 28. Openings 25 interconnect the spaces between the adjacent walls. Longitudinally extending partitions are shown at 32 and are formed integral with the walls 22, 24 and 30. The spaces formed between the walls and partitions define chambers 34 containing liquid propellants for use in the combustion process to produce the required thrust for the rocket. Orifices 35 in the partitions 32 interconnect the chambers 34. The outside metal container of the rocket motor is provided with a boss or protuberance 36 in order to provide a filler port 38 best shown in Figure 4. The wall 24 of the cell like structure lining the inside of the combustion chamber also lines the inside of the filler port 38 as shown at 40. The mouth of the filler port terminates into a tapered portion 42 in order to provide a seat or the like. The filler cap is shown at 44 which is of any well known type of construction and is mounted on the boss 36 by threads or the like 46. A tapered male portion 48 is provided on the cap to fit into the mouth of the filler port so as to seat on the tapered portion 42. The tapered metal portion has a sealing material bonded thereto, such as polyethylene or the like 49, in order to form a seal therebetween. A pyrotechnic or catalytic device 50 for igniting the propellants extends into the cylindrical walls defining an expandible combustion chamber 12. In order to start the initial combustion by igniting the pyrotechnic or catalytic device 50 a plurality of lead wires 52 is provided.

To establish reaction thrust for acceleration of the rocket, the pyrotechnic device is set off to rupture the cellular structure which admits the reactant into the combustion chamber 12 where it will proceed to react under the influence of temperature and pressure provided initially by the pyrotechnic device or under the influence of the catalyst previously mentioned. The reaction will continue to support itself as the cellular structure decays, burns or ruptures and admits fluid into the reaction taking place. I prefer that the walls 22 and 30 of the cellular structure be made of polyethylene although other materials which are equally satisfactory for this use are fluocarbons (commercial examples of which are "Teflon" or "Kel-F"), silicone rubbers or any plastic providing it is not spontaneously ignitable on contact with the liquid propellant employed. In general, the walls 22 and 30 are not metallic except that aluminum or magnesium can be used providing the metal can be oxidized properly to become an attractive source of thrust. The cell structure is not subjected to great pressures since it hydraulically transmits all pressure directly to the outer walls of the combustion chamber. As soon as combustion is established and the combustion chamber is up to full pressure, the entire cellular structure becomes pressurized. However any one cell, although it is raised to chamber pressure, is actually under very little stress. Therefore, there is no need for a strong, difficult-to-breach cell wall. As the reaction continues the cellular structure dissipates and the chamber 12 expands. This will continue until the reactant has been exhausted and the combustion chamber 12 expands and finally takes the shape of the outer metal wall 13. By this arrangement the self pressurizing characteristic of the fluid contained in the expendible cell-like structure eliminates the need for the use of expensive turbopumps which requires additional fuel for its operation, an additional tank for the storing of the propellant, and various types of valves for controlling the flow of the reactant into the combustion chamber of the rocket motor.

A system, in which two or more reactants are used in the rocket motor, is shown in Figure 3. In this embodiment, the cell like structure is of different construction in that three different reactants are shown in A, B, C. The cellular structure 20 is formed with a series of interconnected chambers 52. This is accomplished by providing each chamber 34 in Figure 1, with a plurality of transverse partitions 54 extending between adjacent walls, for example, 22 and 30. The partitions 54 and the walls 22 and 30 form the chambers 52. Also, for example, the chambers containing reactant A, are interconnected through the orifices 56. Each chamber 52 is in communication with the radially inwardly adjacent chamber containing a like reactant, each of the chambers 52 are separated from an adjacent longitudinally positioned chamber by partition 54 having a different reactant. In this manner, the innermost radially inwardly chamber is connected to the outermost radially outwardly chamber by orifices 56 so that upon the cylindrical wall 22 collapsing under the initial combustion process, the remaining rows of reactants will ignite in a sequential manner. The chamber configuration for each reactant is proportioned in such a manner in relation to the chambers of the other reactants so as to provide the correct amounts of reactants for ideal mixing of the reactants to obtain optimum performance. It is noted that in this modification where more than one liquid is used, the size of the cellular chambers 52 should be designed in accordance with a chemical reaction that is intended to take place. Also, a different filler plug is used for each reactant. For example, filler plug 60 provides a means for filling particular chambers with reactant A, filler plug 62 for other chambers with reactant B, and filler plug 64 for still other chambers with reactant C.

While the particular embodiment of the invention has been illustrated and described, it will be obvious to those skilled in the art that various changes and modifications may be made without departing from the invention, and it is intended to cover in the appended claims all such changes and modifications that come within the true spirit and scope of this invention.

What I claim as new and desire to secure by Letters Patent of the United States is:

1. A high energy gas producer comprising a casing having an exhaust nozzle, a cellular-like structure containing a plurality of cells therein disposed within the casing, at least one reactant carried within the cells, the cell-like structure having a plurality of interconnected radially outwardly extending chambers, means for initiating a chemical reaction of said reactant to rupture said cellular-like structure, said reactant producing high energy gas upon rupture of said cellular-like structure, each of said chambers rupturing successively.

2. A high energy gas producer comprising a container having a casing forming a combustion chamber and terminating in an exhaust nozzle capable of producing thrust upon gas being forced therethrough, an expendible cellular-like structure positioned in said casing, said cellular-like structure forming a plurality of chambers adapted to contain at least one reactant, at least one filler port in the casing of said container, a filler port in said expendible cellular-like structure lining the filler port in said casing, each of said filler ports adapted to receive one reactant, said cellular like structure having chambers therein which are interconnected by ports so as to provide a series of successive radially positioned chambers, means for rupturing and igniting the innermost chamber, said reactant forming combustion products under sufficiently high pressure to produce thrust as they pass through the nozzle of the gas producer.

3. A high energy gas producer having a casing of cylindrical form, said container terminating in an exhaust nozzle at one end thereof, an expendible cellular-like structure lining the inside of said cylindrical casing, said expendible cellular-like structure having a plurality of longitudinally extending walls extending the entire length of the casing, a plurality of partitions extending longitudinally and radially outwardly so as to form longitudinal segments, each of said longitudinal segments having a plurality of transverse walls so as to divide each segment into small chambers, each of said chambers being separated from its adjacent longitudinally positioned chamber without communication therewith, each of said chambers being separated from other adjacent chambers positioned radially outwardly but being in communication therewith through an orifice, each adjacent radially inwardly chamber containing the same reactant, and means for rupturing the innermost longitudinal chambers to enable the different reactants to chemically unite to produce the gaseous products capable of producing thrust upon passing through the nozzle, each of the longitudinal rows of chambers successfully rupturing to produce a sustained length of combustion rather than a single explosion.

References Cited in the file of this patent

UNITED STATES PATENTS

| | | |
|---|---|---|
| 1,376,316 | Chilowsky | Apr. 26, 1921 |
| 2,462,099 | Hickman | Feb. 22, 1949 |
| 2,700,337 | Cumming | Jan. 25, 1955 |

FOREIGN PATENTS

| | | |
|---|---|---|
| 543,739 | Great Britain | Mar. 11, 1942 |